(12) United States Patent
Oliver et al.

(10) Patent No.: US 6,341,677 B1
(45) Date of Patent: Jan. 29, 2002

(54) VEHICLE ROTARY SUSPENSION DAMPER OF COMPOSITE CONSTRUCTION

(75) Inventors: Michael L. Oliver, Xenia; William C. Kruckemeyer, Beavercreek; John P. Clifford, Englewood, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/729,030

(22) Filed: Dec. 4, 2000

(51) Int. Cl.[7] .................................................. F16F 9/14
(52) U.S. Cl. ........................ 188/307; 188/290; 188/296
(58) Field of Search ............................... 188/290, 293, 188/296, 308

(56) References Cited

U.S. PATENT DOCUMENTS

| | | | | |
|---|---|---|---|---|
| 4,666,386 A | * | 5/1987 | Winkler et al. | 188/307 |
| 5,381,877 A | * | 1/1995 | Kobayashi | 188/290 |
| 6,082,507 A | * | 7/2000 | Förster | 188/296 |
| 6,173,822 B1 | * | 1/2001 | Korb et al. | 188/307 |

* cited by examiner

*Primary Examiner*—Matthew C. Graham
(74) *Attorney, Agent, or Firm*—Scott A. McBain (57) ABSTRACT

A rotary damper for a vehicle trailing arm suspension mechanism includes a housing defined by a body molded of a reinforced plastic and defining a fluid filled cavity in which a multi-bladed rotor is disposed to form plural fluid filled damper chambers. The rotor is connected to a shaft which is part of a linkage of the suspension system and the housing is operably secured to the vehicle frame. The rotor may also be formed of a molded plastic or cast or otherwise fabricated metal which is covered with an overmolded layer of plastic. The rotor tips may include elastomer seal strips or as cast seal strips and providing a slight interference fit with the housing cavity surfaces. Fluid sealing between the rotor and the body and housing cover plates is provided by the separate or integral seal strips or by clearances small enough to restrict fluid flow except through flow restricting passages and damping action control valves.

23 Claims, 6 Drawing Sheets

VEHICLE ROTARY SUSPENSION DAMPER OF COMPOSITE CONSTRUCTION

FIELD OF THE INVENTION

The present invention pertains to a hydraulic rotary damper, particularly adapted for a vehicle trailing arm suspension system, and wherein components of the damper are formed of composites including components formed of all reinforced plastic or components formed of metal which are overmolded with plastic materials at wear and seal surfaces.

BACKGROUND

Rotary dampers are typically used in automobile suspension systems, including trailing arm type suspensions, in particular, to damp the oscillatory motion of the suspension linkage. However, rotary dampers have rather lengthy seal lines or potential fluid leakage paths across the damper rotor between the fluid filled chambers of the damper. Accordingly, rotary dampers require relatively precise fits between parts and precise surface finishes of the respective parts to provide minimal fluid leakage and to avoid degraded damper performance. However, in mass produced automotive vehicle applications, for example, the manufacturing cost associated with forming the damper components of precision cast metal parts or machined metal parts is undesirable. It is to overcome the problems related to cost effective manufacture of rotary dampers which also provide required performance characteristics that the present invention is directed.

SUMMARY OF THE INVENTION

The present invention provides an improved rotary suspension damper for a vehicle suspension system.

In accordance with one aspect of the present invention, a rotary damper is provided which includes a rotor having a core portion constructed of powder metal and which includes a plastic overmolded layer on the hub and blades of the rotor, a housing constructed of reinforced plastic and molded over a metal valve ring assembly. Elastomeric seals are provided to retain a hydraulic damping fluid within the housing of the rotary damper. Internal fluid leakage between the rotor end faces and the side plates of the damper housing, as well as fluid leakage between the rotor tips and the body of the housing is controlled by dimensional clearances and by selecting a fluid with a viscosity to minimize fluid flow.

In accordance with another aspect of the invention, a rotary damper for a vehicle suspension system is provided with a rotor having a core portion of reinforced plastic formed over a metal hub, a body molded from reinforced plastic molded over a metal reinforcing ring assembly wherein the inner surface of the body and the outer surface of the rotor are both provided with plastic overmolded wear surfaces. The plastics used for the overmolded wear surfaces of the rotor and the body are preferably of different compositions and are different than the compositions of the core portions of the rotor and the body. Elastomeric seals retain the damping fluid within the device and ribs may be provided along the sides and end faces of the rotor and on inwardly extending projections of the body to control fluid leakage between rotor chambers.

In accordance with a further aspect of the invention, a rotary damper is provided for a vehicle suspension system wherein the rotor and body are each formed of long fiber reinforced plastics, the body is molded over a metal ring assembly and elastomeric seals provide sealing to contain fluid within the damper and to control fluid flow around the damper rotor.

The present invention further provides an improved rotary damper for a vehicle suspension system according to the above-mentioned improvements and which is further characterized by improved flow control valves for controlling the flow of hydraulic damping fluid in a way to allow the damper to react differently to torque caused when the vehicle wheel is raising (jounce) and when the wheel is lowering (rebound). The improved rotary damper may be tuned by selecting a proper valve seat, including selection of fluid passages in a valve seat plate and the configuration of valve disks so as to control flow through the valves.

Those skilled in the art will further appreciate the above-mentioned advantages and superior features of the invention together with other important aspects thereof upon reading the detailed description which follows in conjunction with the drawings.

DETAILED DESCRIPTION OF PREFERRED EMBODIMENTS

In the description which follows, like parts may be marked throughout the specification and drawing with the same reference numerals, respectively. The drawing figures may not be to scale and certain elements may be shown in schematic or generalized form in the interest of clarity and conciseness.

Figure 1:
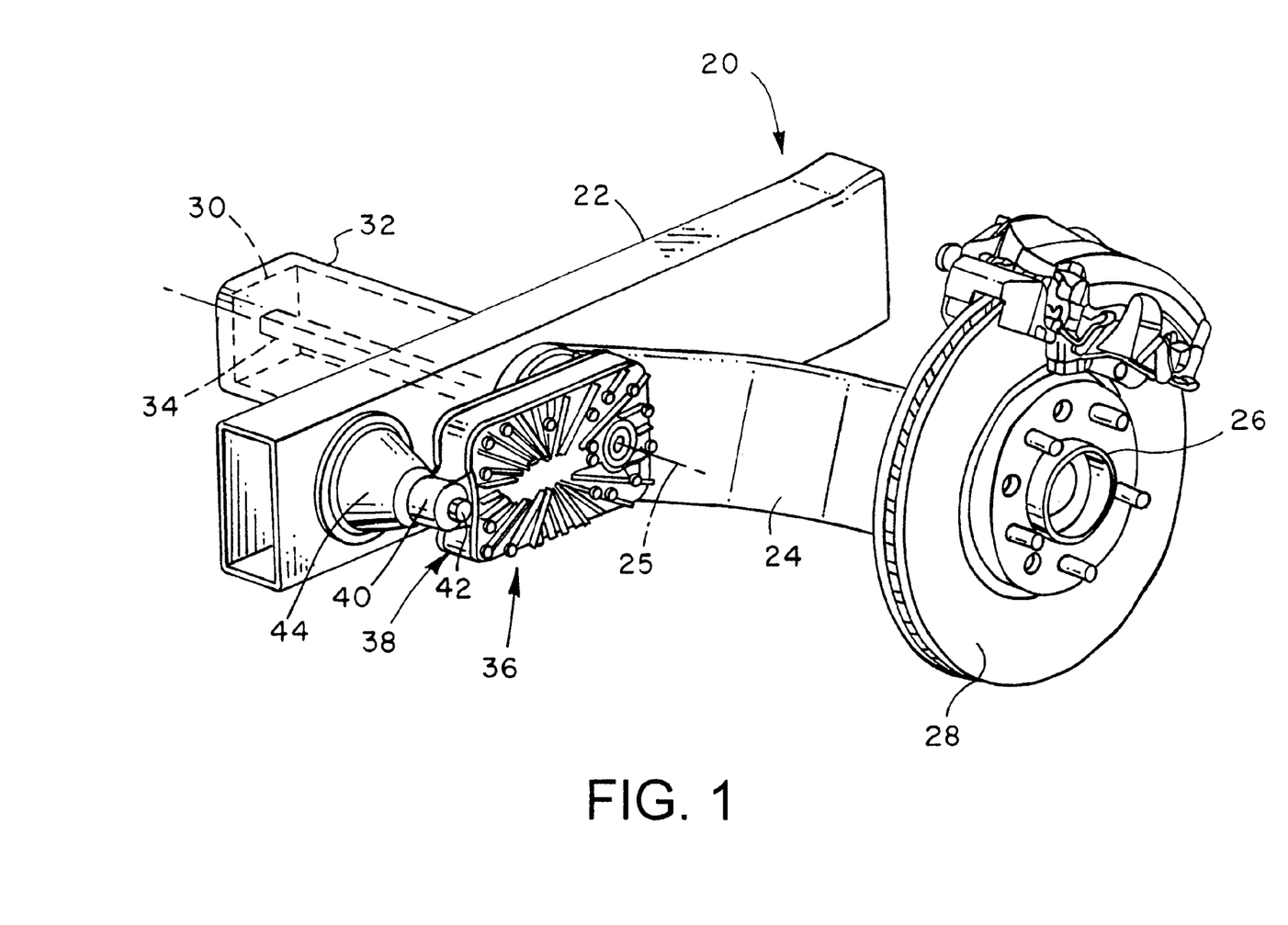
FIG. 1 is a perspective view of a portion of a vehicle including a trailing arm type wheel suspension and a rotary damper in accordance with the invention.

Referring to FIG. 1, there is illustrated a portion of a wheeled vehicle 20 including a frame or body member 22 supporting a trailing arm type wheel support member 24. Wheel support member 24 supports a rotatable wheel hub 26 and brake rotor 28. Trailing arm support member 24 is suitably mounted on frame member 22 for oscillatory movement about an axis 25 and is suitably connected in a conventional manner to an elastomer type spring 30 by a shaft 34. Spring 30 is disposed in a tubular support member 32 and is fixed to shaft 34 which is secured for rotation or oscillation with the trailing arm support member 24. Shaft 34 is shown to have a square cross section but other configurations forming a coupling between shaft 34 and the components, including spring 30, coupled to the shaft may be provided.

Shaft 34 is also connected to a rotary damper unit, generally designated by the numeral 36, which is operable to damp oscillatory movement of the wheel support member 24 to act in the manner of a so called shock absorber, for example. Damper unit 36 includes a housing 38 having a laterally projecting boss portion 40 secured by a fastener 42 to a member 44 secured to the frame member 22 to prevent rotation of the housing of the damper unit about the axis 25.

Figure 2:
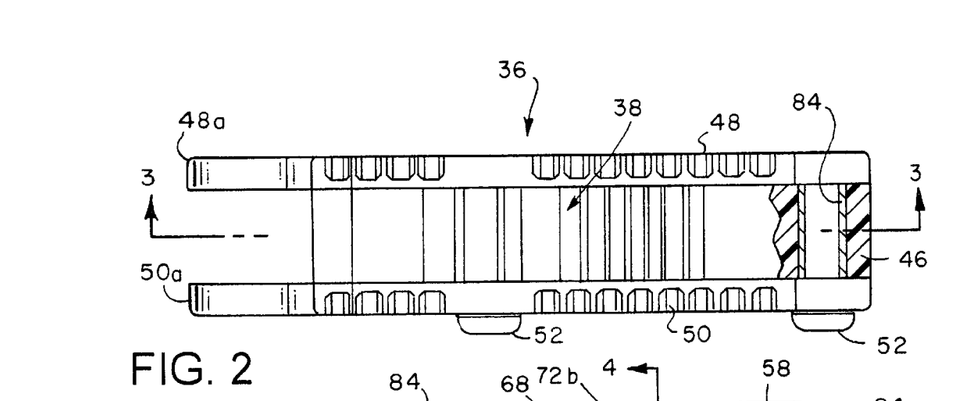
FIG. 2 is a top plan view of one preferred embodiment of a rotary damper in accordance with the invention.
Figure 3:
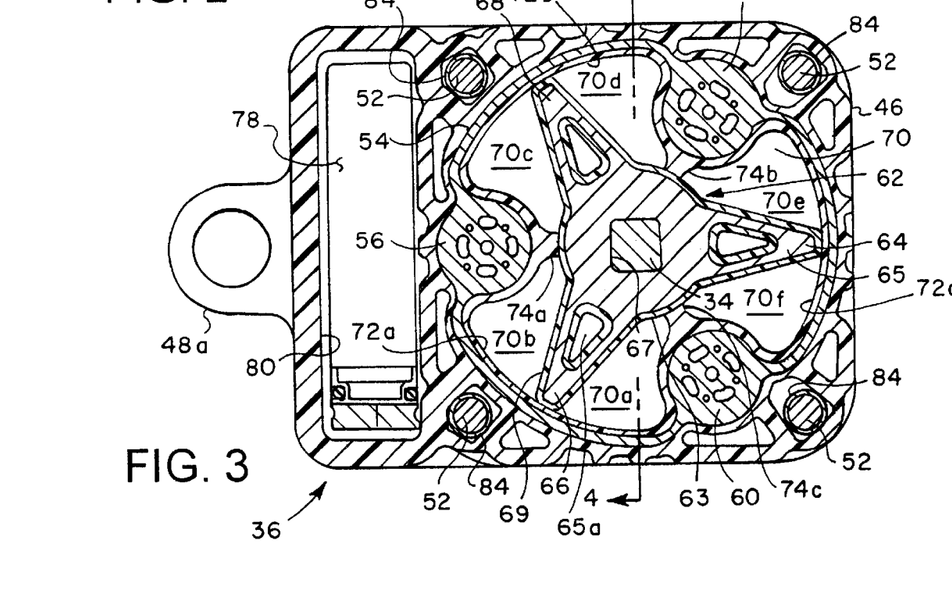
FIG. 3 is a central section view taken generally along the line 3—3 of FIG. 2.
Figure 4:
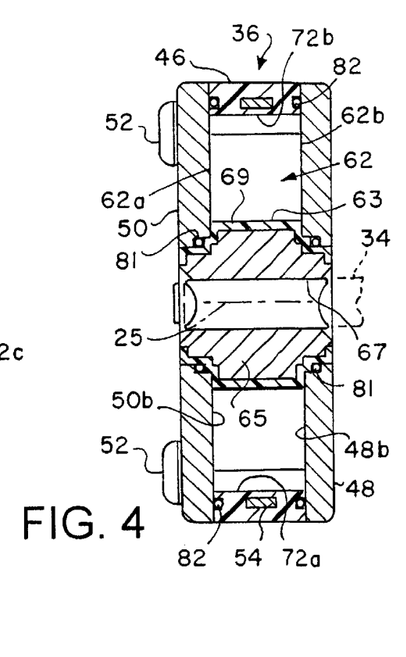
FIG. 4 is a section view taken generally along the line 4—4 of FIG. 3.

Referring now primarily to FIGS. 2, 3 and 4, the damper unit 36 includes a generally rectangular body 46 and opposed generally planar cover plates 48 and 50 forming the housing 38. The boss 40 preferably comprises spaced apart boss portions 48a and 50a on cover plates 48 and 50, as shown in FIG. 2. The cover plates 48 and 50 are secured in assembly with the body 46 by suitable mechanical fasteners 52 comprising machine screws, for example.

Referring now primarily to FIGS. 3 and 4, the body 46 further includes an encapsulated, generally cylindrical metal ring member 54 comprising circumferentially spaced apart, generally cylindrical, valve seat plate parts 56, 58 and 60 which are provided with suitable ports to allow fluid flow therethrough in a manner to be described in further detail herein. A rotor 62 is mounted within a cavity 70 formed by the body 46 and includes three circumferentially spaced radially projecting blades 64, 66 and 68 which cooperate with the body to form fluid filled damping chambers 70a, 70b, 70c, 70d, 70e and 70f. Rotor 62 includes a square cross section central bore 67 which receives square cross section shaft 34 therein and non-rotatable relative to the rotor. The radial outermost tips of the blades 64, 66 and 68 fit within the cavity defining the chambers 70a–70f, as shown in FIG. 3, with a very small clearance or a line-to-line fit against the chamber walls 72a, 72b and 72c of body 46. Body 46 includes radial inwardly projecting seal bosses 74a, 74b and 74c which are dimensioned to have very close tolerance or line-to-line fits against a hub part 63 of rotor 62. A gas charged accumulator 78 is disposed in a cavity 80 formed in body 46 and is operable to maintain a fluid fill within the chambers 70a–70f and to compensate for thermal expansion and contraction of a suitable hydraulic fluid, such as a synthetic base oil or a water and glycol solution, which at least partially fills cavity 80 and all of the chambers 70a–70f when the damper 36 is placed in a working condition. Fluid is contained within the damper 36 by suitable annular o-ring type seals 81 mounted in suitable grooves in the side plates 48 and 50, FIG. 4, and engageable with cooperating reduced diameter portions of the rotor hub portion 63, as shown. Peripheral elastomer seals 82, FIG. 4, are disposed in suitable grooves in the body 46 and in sealing contact with the side plates 48 and 50 when they are assembled to the body.

In operation, the damper 36 damps oscillatory movement of the trailing arm support member 24 and wheel 26 about axis 25. As shaft 34 deflects about axis 25, the rotor 62 rotates to transfer fluid between respective pairs of the chambers 70a–70f. For example, if rotor 62 is deflected in a clockwise direction, viewing FIG. 3, fluid is transferred through suitable passages in the body 46, not shown, from chambers 70b, 70d and 70f to chambers 70c, 70e and 70a, respectively, by way of valves supported on the valve plate parts 56, 58 and 60, in a known manner. Rotation of the rotor 62 in the opposite direction transfers fluid from chambers 70a, 70e and 70c to chambers 70f, 70d and 70b, respectively, also in a known manner.

It is desired to minimize damper fluid leakage between the aforementioned chambers across the outer tips of the rotor blades 64, 66 and 68 and between chambers at the rotor hub 63 and also between chambers at the rotor opposed end faces or side edges. In this regard, the fabrication of the rotor 62 and the body 46 of cast or fabricated metal would require relatively extensive machining to provide the dimensional tolerances required to minimize unwanted fluid leakage between the chambers 70a–70f formed between the rotor and the body. However, in accordance with the present invention, the damper 36 according to FIGS. 2, 3 and 4 includes a rotor 62 having a core portion 65 which may be formed of sintered metal, preferably iron, with a suitable plastic overmolded layer 69 defining the entire exterior surface of the blades 64, 66 and 68, hub 63 and including those portions of the blades and hub which are in very close proximity to the wall surfaces 72a, 72b and 72c, the projections or bosses 74a, 74b and 74c and the housing cover plate surfaces 48b and 50b, FIG. 4. Plastic lined cavities 65a in blades 64, 66 and 68 provide relatively constant wall thickness for core portion 65.

Still further, the body 46 is preferably formed of a molded plastic which is operable at all elevated temperatures to which a vehicle including the damper 36 may be normally disposed. The body 46 may be formed of a temperature resistant nylon or a polyphthalamide which is suitably filled with reinforcing fibers of selected materials which may include glass or mineral fibers, for example. Moreover, the body 46 is reinforced by the metal ring member 54, Tubular metal sleeves 84, FIGS. 2 and 3, extend between the opposite side faces of the body 46 to receive the fasteners 52 and to provide sufficient strength to prevent distortion of the body due to fastener overtightening or due to material creep. The cover plates 48 and 50 may be formed of metal, such as aluminum, or molded plastic of the same composition as the body 46.

One particular advantage of the configuration of the rotor 62 is that the porosity of the sintered metal core 65 can be controlled to provide enhanced bonding of the plastic overmolded layer 69 to the metal core. Moreover, by injection molding the body 46, and the rotor 62 to provide the overmolded plastic layer 69 on the rotor, dimensional tolerances may be maintained such that very small clearances are provided between the opposed rotor side or end faces 62a, 62b, FIG. 4, and the faces 48b and 50b of the housing cover plates 48 and 50. Moreover, the radial outermost tips of the rotor blades 64, 66 and 68 may also be dimensioned such that very small clearances are provided between the blade tips and the body wall surfaces 72a, 72b and 72c. Still further, fluid viscosity may be selected to minimize fluid leakage flow through all of the clearance spaces between the rotor 62 and the body 46 and between the rotor and the cover plates 48 and 50.

Figure 5:
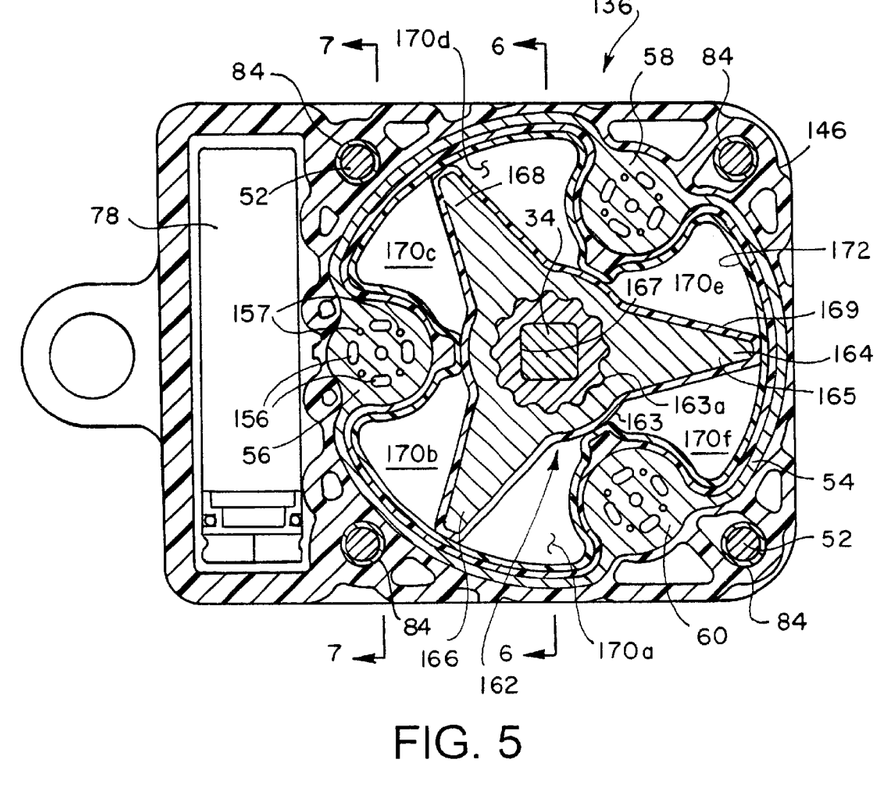
FIG. 5 is a section view similar to FIG. 3 of a first alternate embodiment of the present invention.
Figure 6:
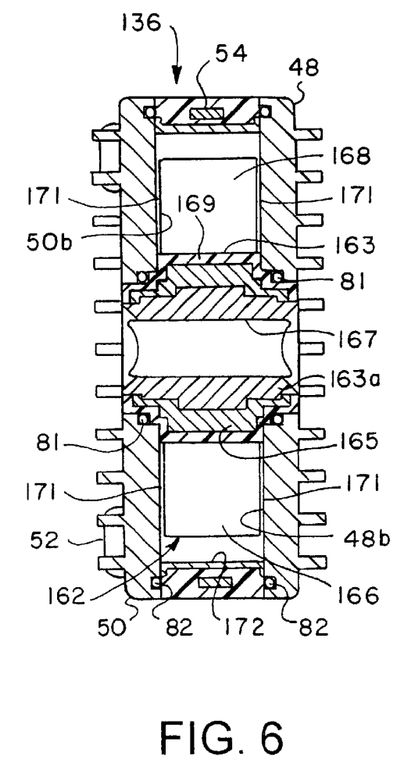
FIG. 6 is a section view taken generally along the line 6—6 of FIG. 5.
Figure 7:
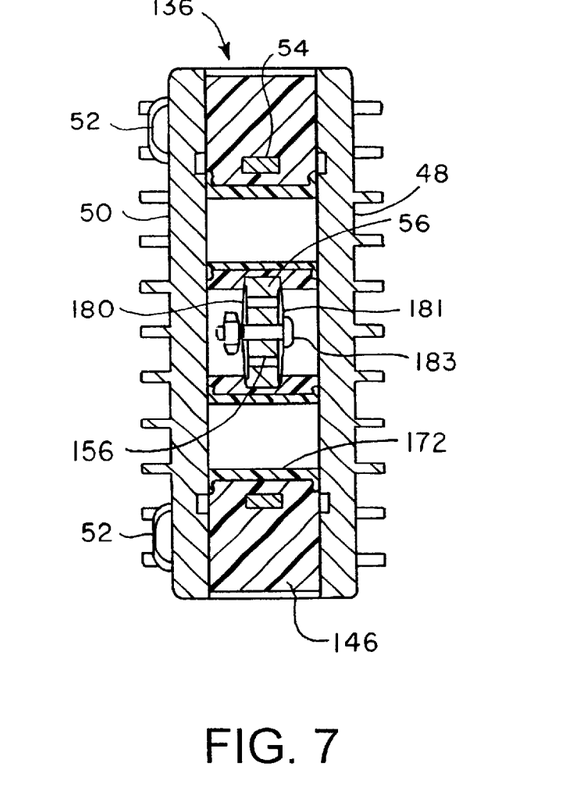
FIG. 7 is a section view taken generally along the line 7—7 of FIG. 5.

Referring now to FIGS. 5, 6 and 7, a first alternate embodiment of a rotary damper in accordance with the invention is illustrated and generally designated by the numeral 136. The damper 136 is substantially like the damper 36 with the exceptions noted herein. Accordingly, a detailed discussion of all of the components of the damper 136 will not be undertaken in the interest of conciseness. The damper 136 includes a body member 146 substantially like the body member 46 and reinforced by molding the body 146 over a metal ring part 54. Fastener receiving sleeves 84 are also molded in or inserted in suitable bores in the body 146 in the same manner as for the body 46.

Figure 5A:
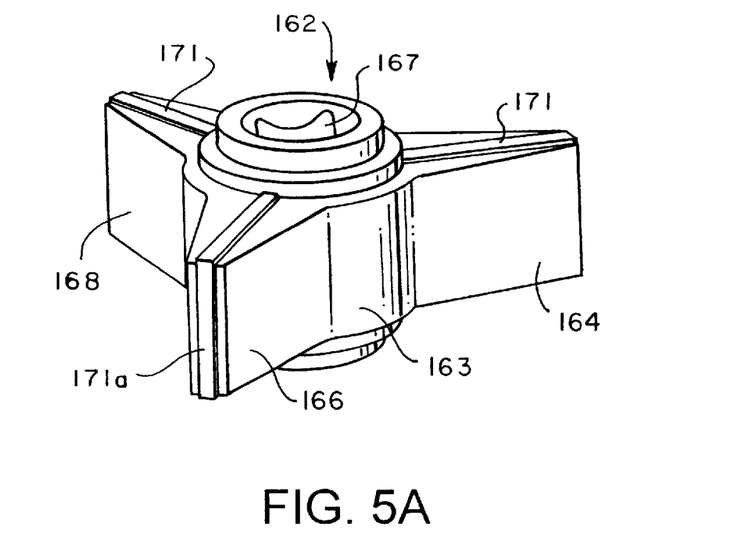
FIG. 5A is a perspective view of the rotor for the damper shown in FIGS. 5 through 7.

The damper 136 includes a rotor 162 having a hub 163 and circumferentially spaced radially projecting blades 164, 166 and 168 of generally the same configuration as the rotor 62. The rotor 162 has a core portion 165 formed of glass fiber or glass fiber/mineral reinforced polyphthalamide or poly-ether sulfone. Alternatively, the core 165 may be formed of aluminum. The core 165 is molded over a metal hub 163a having a suitable square cross section bore 167 for receiving the shaft 34. The rotor 162 is also provided with a plastic layer 169 molded over and encapsulating the core portion 165. As shown in FIG. 5A, the rotor 162 may be provided with suitable ribs projecting from the surface of the layer 169 and extending radially along the opposite sides of the rotor blades 164, 166 and 168, see FIG. 6 also. Transverse ribs 171a, one shown in FIG. 5A, may also extend across the tips of rotor blades 164, 166 and 168. The aforementioned ribs may be dimensioned to form a slight interference fit with corresponding surfaces 48b and 50b of the cover plates and the surfaces of the body 146 delimiting fluid chambers 170a–170f.

The damper 136 is also provided with an overmolded layer 172 on the surfaces of the body 146 which define the chambers 170a–170f. The overmolded layers 169 and 172 may be unfilled or self-lubricated polyamide-imide, unfilled polyphthalamide or polyether-ether ketone. The plastic used to overmold the layer 169 on the rotor 162 should be different from that used to provide the overmolded layer 172 on body 146.

Referring briefly to FIG. 7, a typical damper fluid flow control valve assembly associated with the ring part 54 is illustrated and comprises opposed deflectable disks 180 and 181 which are secured to each of the valve plate portions 56, 58 and 60, by a nut and bolt assembly 183, respectively. The plate portion 56 is shown in FIG. 7 by way of example. The disks 180 and 181 and transverse passages in the plate portions 56, 58 and 60 covered by the disks allow differential reaction to torque caused when the trailing arm support member 24 is raising an attached wheel or when the wheel is lowering. For example, when rotor 162 is moved clockwise viewing FIG. 5, fluid may flow from chamber 170b to 170c through passages 156 which are only partially blocked by disk 180. However, when rotor 162 moves in the opposite direction fluid flow from chamber 170c to 170b is permitted only through smaller passages 157, since passages 156 are blocked by disc 181.

Figure 8:
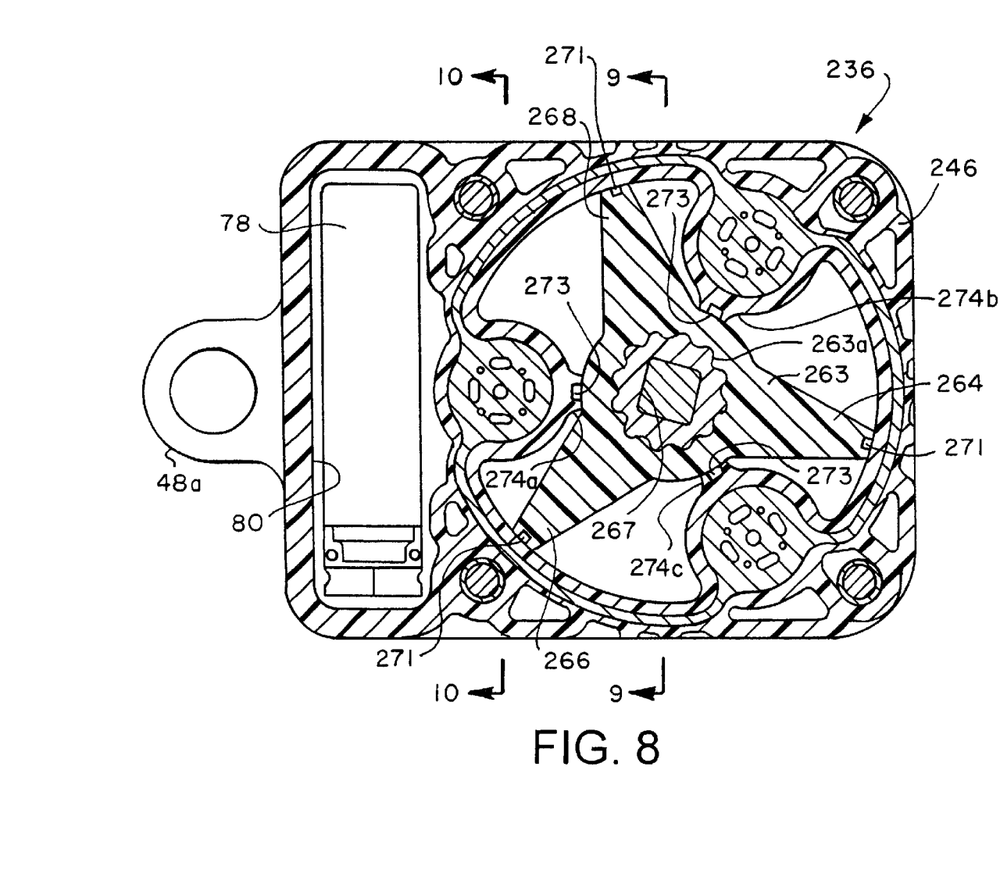
FIG. 8 is a central section view similar to the section views of FIGS. 3 and 5 of a second alternate embodiment of a rotary damper in accordance with the invention.
Figure 9:
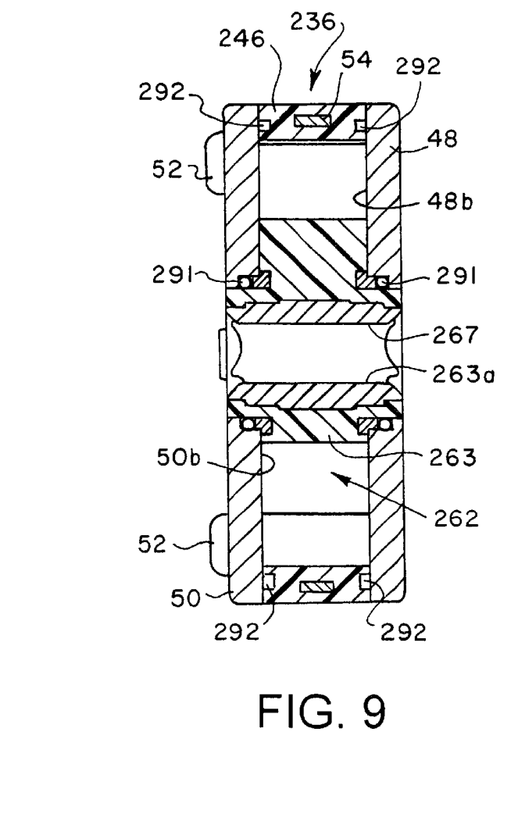
FIG. 9 is a section view taken from the line 9—9 of FIG. 8.
Figure 10:
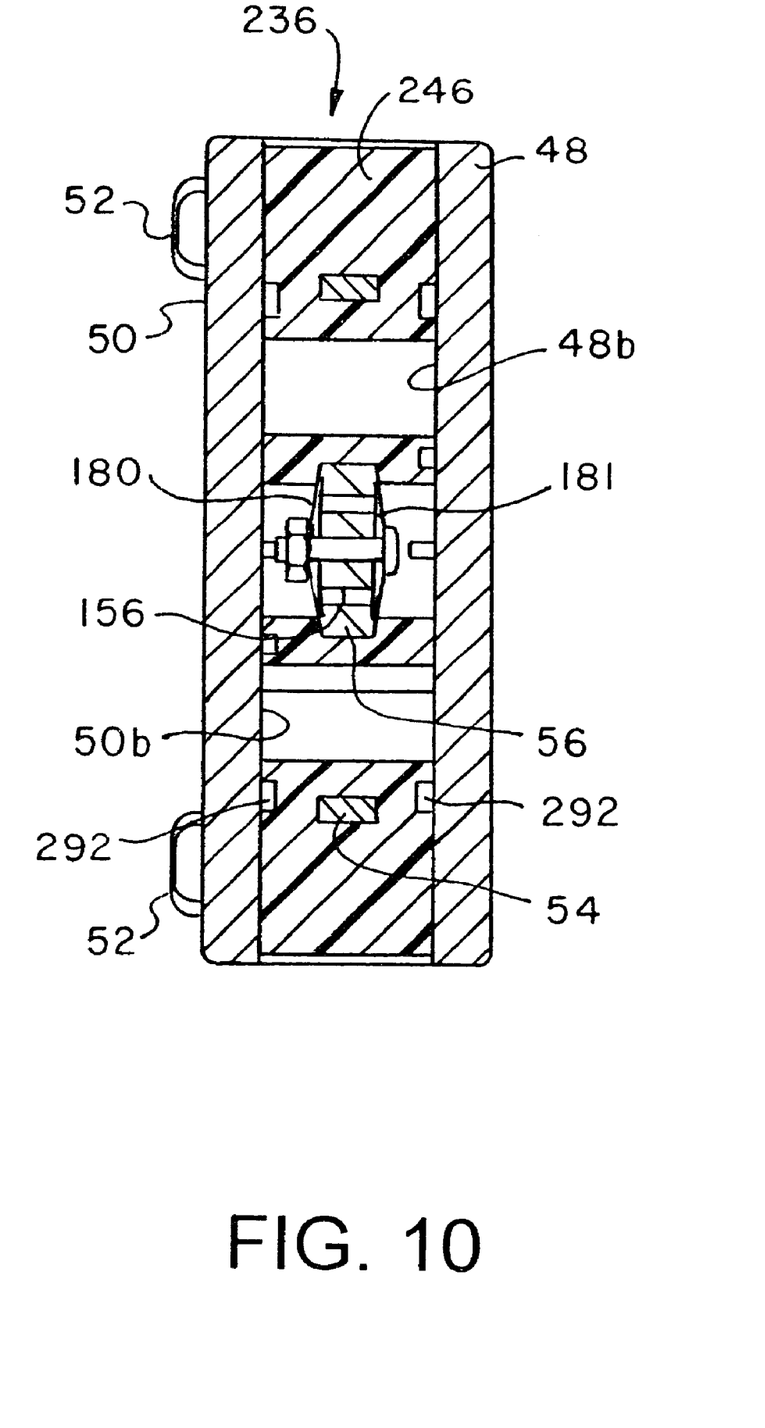
FIG. 10 is a section view taken from the line 10—10 of FIG. 8.

Referring now to FIGS. 8, 9 and 10, a second alternate embodiment of a rotary damper in accordance with the invention is illustrated and generally designated by the numeral 236. The damper 236 includes a body 246 similar in most respects to the body 46 and a rotor 262 similar to the rotor 62 except as described herein. Body 246 is shown as being molded over and encapsulating the ring 54 in the same manner as provided for in the dampers 36 and 136.

The rotary damper 236 is characterized by the rotor 262 comprising a rotor core part 263 which is molded over a metal hub part 263a having a suitable bore 267 for receiving the shaft 34, not shown in FIGS. 8, 9 or 10. The rotor core 263 is preferably formed of long fiber reinforced plastic, such as Isoplast thermoplastic resin, nylon PA6/6 or polyphenylene sulfide. The rotor 262 includes circumferentially spaced radially projecting blades 264, 266 and 268, the radially outermost tips of which are provided with transverse grooves in which are fitted elastomeric seal strips 271, FIG. 8. Elastomer seal strips 273 are also fitted in transverse grooves formed in radially inwardly extending projections or bosses 274a, 274b and 274c of body 246, as also shown in FIG. 8.

The body 246 is formed of molded plastic of one of the types previously mentioned for the damper bodies of the embodiments previously described. The body 246 includes an encapsulated ring 54 and continuous peripheral fluid containment seals 292, FIG. 9, which are disposed in opposed peripheral grooves in the body 246 and are in fluid tight sealing engagement with surfaces 48b and 50b of the housing cover plates 48 and 50, as shown in FIGS. 9 and 10. Suitable o-ring seals 291 disposed in suitable grooves in cover plates 48 and 50 and are engageable with the rotor hub 263 at opposite sides thereof, as shown in FIG. 9, to prevent fluid leakage out of the damper 236. As with the damper 136, it is preferable that the rotor 262 and body 246 be molded of dissimilar plastics but of one of the types mentioned hereinbefore.

In all of the embodiments described above. The plastic molding or overnolding may be carried out using techniques known to those skilled in the art and with enough precision in dimensional control to eliminate the need for machining the seal surfaces between the rotor and the body and between the rotor and the housing side plates of the embodiments disclosed. The construction and operation of the rotary dampers 36, 136 and 236 is believed to be understandable to those of skill in the art based on the foregoing description. Although preferred embodiments have been described in detail herein and certain materials specified, those skilled in the art will also recognize that various substitutions and modifications may be made without departing from the scope and spirit of the appended claims.

What is claimed is:

1. A rotary suspension damper for a wheeled vehicle comprising:

a housing adapted to be mounted on a support part of said vehicle, said housing comprising a body member formed of a plastic molded over a metal reinforcing member surrounding a cavity such that an inner layer of said plastic formed wall surfaces of said body member and delimiting said cavity; and a rotor disposed in said cavity, said rotor including plural, circumferentially spaced apart, substantially rigid, radially projecting blades cooperable with said body member to divide said cavity into plural fluid filled chambers, said rotor including a metal hub part for receiving a shaft member and an outer layer formed of molded plastic defining surfaces of said rotor which are dimensioned to be in substantial fluid sealing relationship to said wall surfaces of said body member to limit fluid leakage flow between said chambers.

2. The damper set forth in claim 1 wherein:

said rotor includes a core part intermediate said hub part and said outer layer.

3. The damper set forth in claim 2 wherein:

said hub part and said core part are integrally formed of powdered metal.

4. The damper set forth in claim 2 wherein:

said core part and said outer layer are integrally formed of plastic.

5. The damper set forth in claim 2 wherein:

said hub part and said core part are formed of different metals and said outer layer is over molded said core part.

6. The damper set forth in claim 1 wherein:

said inner layer of plastic forming said wall surfaces is formed of a first plastic composition and said outer layer of plastic defining said surfaces of said rotor is formed of a second plastic composition different from said first plastic.

7. The damper set forth in claim 6 wherein:
said first plastic comprises one of filled or unfilled polyphthalamide, polyether-sulfone isoplast thermoplastic resin, Nylon pa 6/6 and polyphenylene.

8. The damper set forth in claim 6 wherein:
said second plastic comprises one of polyamide-imide, polyphthalamide and polyether-ether ketone.

9. The damper set forth in claim 6 including:
a layer of a third plastic disposed over said inner layer of said first plastic and forming said wall surfaces of said body member delimiting said cavity.

10. The damper set forth in claim 9 wherein:
said third plastic is of a composition different from said second plastic.

11. The damper set forth in claim 1 wherein:
said outer layer of said rotor includes molded ribs projecting from opposed sides of said blades and dimensioned to be in substantial fluid sealing relationship with opposed side plates of said housing, said side plates being engaged with said body member to at least partially define said chambers.

12. The damper set forth in claim 11 wherein:
said blades include seal strips extending transversely across the tips of said blades between said side plates and dimensioned to be in substantial fluid scaling relationship with said surfaces of said body member delimiting said chambers.

13. The damper set forth in claim 1 wherein:
said metal reinforcing member comprises a generally ring shaped member including spaced apart portions supporting valve members for valving fluid between said chambers.

14. A rotary suspension damper for a wheeled vehicle comprising:
a housing adapted to be mounted on a support part of said vehicle, said housing comprising a body member formed of a first plastic molded such that a layer of said first plastic forms wall surfaces of said body member delimiting a cavity of said body member; and
a rotor disposed in said cavity and cooperable with said body member to divide said cavity into plural fluid filled chambers, said rotor including plural circumferentially spaced apart radially projecting substantially rigid blades dimensioned to include tip portions disposed in substantial fluid sealing relationship with said wall surfaces delimiting said cavity, said rotor including a metal hub part for receiving a shaft member and an outer layer formed of a second plastic defining surfaces of said rotor including said tip portions which are dimensioned to be in close proximity to said wall surfaces of said body to limit fluid leakage flow between said chambers, said first plastic being of a composition different from said second plastic.

15. The damper set forth in claim 14 wherein:
said rotor includes a core part intermediate said hub part and said outer layer.

16. The damper set forth in claim 15 wherein:
said hub part and said core part are integrally formed of powdered metal.

17. The damper set forth in claim 15 wherein:
said core part and said outer layer are integrally formed of said second plastic.

18. The damper set forth in claim 14 wherein:
said first plastic comprises one of filled or unfilled polyphthalamide, polyether-sulfone isoplast thermoplastic resin, Nylon pa 6/6 and polyphenylene.

19. The damper set forth in claim 14 wherein:
said second plastic comprises one of polyamide-imide, polyphthalamide and polyether-ether ketone.

20. The damper set forth in claim 14 wherein:
said wall surfaces of said body member are formed by a third plastic disposed over said first plastic and delimiting said cavity.

21. The damper set forth in claim 20 wherein:
said third plastic is of a composition different from said second plastic.

22. The damper set forth in claim 14 wherein:
said body member includes a generally ring shaped metal reinforcing member embedded in said first plastic and surrounding said cavity.

23. The damper set forth in claim 22 wherein:
said metal reinforcing member includes spaced apart portions supporting respective valve members for valving fluid between said chambers.

* * * * *